US010042928B1

(12) United States Patent
Brown et al.

(10) Patent No.: US 10,042,928 B1
(45) Date of Patent: Aug. 7, 2018

(54) SYSTEM AND METHOD FOR AUTOMATED REASONING WITH AND SEARCHING OF DOCUMENTS

(71) Applicant: The United States of America as represented by the Director, National Security Agency, Washington, DC (US)

(72) Inventors: Raymond E. Brown, Arnold, MD (US); Daniel J. Clouse, Annapolis, MD (US); Duane J. Einfeld, Odenton, MD (US); John B. Maddox, Annapolis, MD (US); David J. Marcos, Washington, DC (US)

(73) Assignee: The Government of the United States as represented by the Director, National Security Agency, Washington, DC (US)

( * ) Notice: Subject to any disclaimer, the term of this patent is extended or adjusted under 35 U.S.C. 154(b) by 651 days.

(21) Appl. No.: 14/121,006

(22) Filed: Dec. 3, 2014

(51) Int. Cl.
   *G06F 17/30* (2006.01)

(52) U.S. Cl.
   CPC .............................. *G06F 17/30864* (2013.01)

(58) Field of Classification Search
   CPC ................................................ G06F 17/30864
   See application file for complete search history.

(56) References Cited

U.S. PATENT DOCUMENTS

| 7,567,959 | B2 | 7/2009 | Patterson |
| 7,613,602 | B2 | 11/2009 | Kanawa |
| 8,266,155 | B2 | 11/2012 | Dexter et al. |
| 8,447,758 | B1 | 7/2013 | Adler et al. |
| 2006/0074980 | A1* | 4/2006 | Sarkar ................. G06F 17/3089 |
| 2008/0027933 | A1 | 1/2008 | Hussam |
| 2009/0063384 | A1* | 3/2009 | Cho ......................... G06N 5/04 706/47 |

OTHER PUBLICATIONS

Breaux, Regulatory Requirements as Open Systems: Structures, Patterns and Metrics for the Design of Formal Requirements Specifications, Feb. 25, 2011, pp. 1-17, CMU-ISR-11-100, Carnegie Mellon University, Pittsburgh, PA.
Breaux, Early Studies in Acquiring Evidentiary, Reusable Business Process Models for Legal Compliance, Apr. 2009, pp. 272-277, ITNG '09 Proceedings of the 2009 Sixth Intern'l Conference on Information Technology: New Generations.

* cited by examiner

*Primary Examiner* — Samantha K Abraham (57) ABSTRACT

A method and computer system architecture for providing to a computer user or to a downstream system a means of converting the content of documents including legal, policy, and compliance statements, using symbolic logic, into a logic ontology, which enables users to reason through the content of laws, policies, and procedures by means of automated reasoning. The system additionally includes a process for easily searching or navigating multiple facets of legal, policy, and compliance documents.

12 Claims, 6 Drawing Sheets

SYSTEM AND METHOD FOR AUTOMATED REASONING WITH AND SEARCHING OF DOCUMENTS

FIELD OF INVENTION

The disclosure herein relates generally to data processing and techniques thereof; in particular knowledge processing techniques, database design, recording, filing, and data search techniques.

BACKGROUND OF THE INVENTION

Today, individuals and entities are often bombarded with an immense amount of data including documents containing various types of information. There is a need to be able to translate documents consisting of various types of information into logical formulations for automated reasoning, enabling question-answer interaction with individuals as well as systems. There is also a need to be able to query this type of data and obtain a definitive answer quickly. The prior art include many variations of information retrieval systems, but they all lack the ability to translate a document information into logical formulations for automated reasoning and to respond to a query with a definitive answer. Consider the following prior art:

U.S. Pat. No. 7,613,602, entitled "Structured Document Processing Apparatus, Structure Document Search Apparatus, Structured Document System, Method, and Program," discloses a document storage system with a querying capability based on statistical modeling of the documents. The prior art appears to run statistical analyses to understand the relationships and determine how the content is organized based on the structural meta-data of the original document itself. Information is then returned to users based on the scoring results. The present invention does not score results to return information to users. Additionally, unlike the present invention, the prior art does not utilize logic to respond to query. U.S. Pat. No. 7,613,602 is hereby incorporated by reference into the specification of the present invention.

Similarly, U.S. Pat. No. 7,567,959, entitled "Multiple Index Based Information Retrieval System," discloses a system that automatically crawls the internet for information that is then statistically processed and indexed for ranked retrieval. Unlike the prior art, the present invention does not perform large scale indexing, rank, or retrieval of information nor use statistical processing methods to count and cluster words to find relationships across documents. U.S. Pat. No. 7,567,959 is hereby incorporated by reference into the specification of the present invention.

U.S. Pat. No. 8,266,155, entitled "Systems and Methods of Displaying and Re-Using Document Chunks in a Document Development Application," discloses a system and method for information retrieval that enables distributed indexing of web pages and other documents and, like the previous prior art discussed, fails to focus on the conceptual understanding of the meaning of the content. U.S. Pat. No. 8,266,155 is hereby incorporated by reference into the specification of the present invention.

U.S. Pat. No. 8,447,758, entitled "System and Method for Identifying Documents Matching a Document Metaprint," discloses a distributed storage system and method for searching for documents by generating a "metaprint." The prior art also discloses a method for crawling a network to locate documents and store them within the system to make it easier to find and discover information. Unlike the prior art, the present invention does not crawl a network to locate and store documents. Additionally, unlike the prior art, the present invention does not use frequency analysis when generating meta-data about documents. The prior art also does not employ logical formulations for automated reasoning. U.S. Pat. No. 8,447,758 is hereby incorporated by reference into the specification of the present invention.

U. S. Pat. Appl. No. 2008/0027933 A1, entitled "System and Method for Location, Understanding, and assimilation of Digital Documents through Abstract Indicia," discloses a system and method for information retrieval that uses a webcrawler that finds already digitized documents and exploits the meta-data within them. The present invention does not use a webcrawler and performs its own process to convert documents into structured, digital form. The prior art additionally fails to focus on the conceptual understanding of the meaning of the content. U. S. Pat. Appl. No. 2008/0027933 A1 is hereby incorporated by reference into the specification of the present invention.

SUMMARY OF THE INVENTION

An object of the present invention is to disclose a system that enables users to easily search and discover a wide range of content and relationship information—ideas, concepts, semantic, hierarchical, referential, and logical relationships—within a set of documents which includes, but is not limited to, legal, policy, and compliance documents. The system enables users to vary what types of information may be accessed from the legal, policy, and compliance documents by mapping documents into a reconfigurable data and knowledge model. Users can easily do so by using a standardized, machine readable format.

An additional object of the present invention is to disclose a method for generating Rule Description Logic (RDL) statements for generating a rule ontology for the purposes of performing automated reasoning of legal, policy, and compliance rules comprising the steps of generating at least one structured document, preparing the at least one structured document for a logic conversion, generating at least one logic statement using a logic language, and converting the at least one logic statement into a rule ontology.

Yet another object of the present invention is to disclose a method for discerning the underlying meaning of the content itself to provide definitive answers to a user's query.

DETAILED DESCRIPTION

Figure 1:
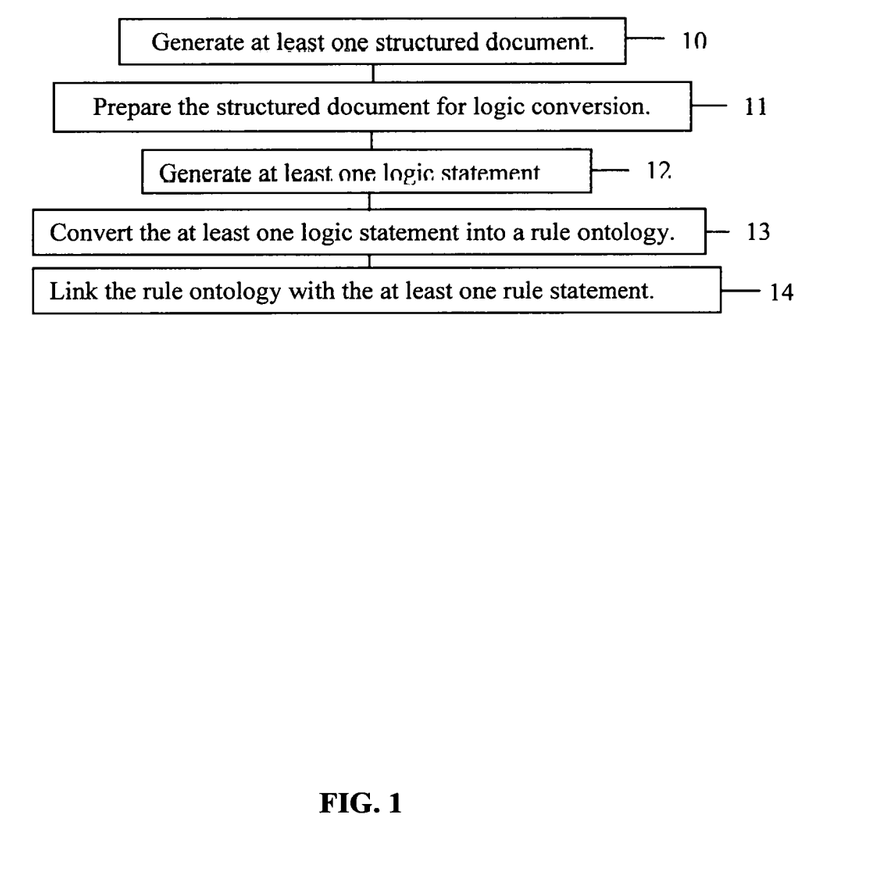
FIG. 1 discloses a high level view of the present invention.

The present invention, as depicted in FIG. 1, is a system and method that enables a user to easily search and discover a wide range of content and relationship information—ideas, concepts, semantic, hierarchical, referential, and logical relationships—within a set of documents which includes, but is not limited to, legal, policy, and compliance documents. The system also enables a user to vary what types of information may be accessed from the legal, policy, and compliance documents by mapping documents into a reconfigurable data and knowledge model. Finally, the present invention produces Rule Description Logic statements to perform automated reasoning and to draw conclusions from the content by discerning the underlying meaning of the content (e.g., statutes, policies, etc.) itself to answer a user's query.

In order to better understand the present invention, the following terms have been defined for the reader's benefit.

Alethic Logic—A form of modal logic that focuses on necessity and possibility.

Alethic Term—Any word or phrase referring to the modalities of necessity and/or possibility, such as: able, ability, can, could, possible, possibility.

Assignment (a) Operator—The symbol 'a' in RDL, used to convert a concept 'C' into the role of 'being assigned to be or to do C by [someone].' Example: If 'IsADirector' is the concept of being the director of an organization, then 'a(IsADirector)' is the role of being assigned to be a director by [someone], and '(x)a(IsADirector)(y)' means x is assigned to be a director by y. Additional Information: The assignment operator is especially useful in conjunction with the permission operator ('P') to represent "approval," viewed as "assigning permission." Example: If 'e' is an employee, 's' is a supervisor, and 'TakeLeave' is the concept of taking leave, then '(e)a(P(TakeLeave))(s)' means the employee is approved (assigned to be permitted) to take leave by the supervisor. The role inverse of the assignment operator is symbolized 'a-'; it yields the role inverse of what the assignment operator yields. For example, '(x)a-(IsADirector)(y)' means that y is assigned to be a director by x (rather than x by y).

Assignment Relation—A relation in RDL stated using the RDL assignment operator ('a') or its role inverse. See 'relation', 'assignment operator'.

Assignment Role—A role in RDL that represents 'being assigned to be or to do [a concept] by [someone].' If 'C' is the concept, then the role of being assigned to be or to do 'C' is represented as 'a(C)'—see 'Assignment Operator'.

Atomic Concept—A concept in Description Logic that is represented by a single name (i.e., identifier), as opposed to a concept that is represented only by being constructed from two or more other concepts or roles.

Authority Tag—Document mark-up describing the law or policy that a given document (or section of a document) pertains to. An example of such would be to tag a document with the tag "Affordable Healthcare Act" to denote a document that falls under the authority of the Patient Protection and Affordable Care Act of 2010.

Bottom Concept—Symbolized '⊥' in Description Logic, this is the concept that holds for no individuals. That is, if x is any individual, then '(x)⊥' is false.

Cartesian Product—An operation in Rule Description Logic (RDL) and some other description logics. Specifically, given two concepts 'C' and 'D', their Cartesian product 'C×D' is also a concept. It is the concept that describes pairs of individuals (x, y), where x is described by C, and y is described by D. Example: If 'Man' and 'Woman' are concepts (representing men and women, respectively), then 'Man×Woman' is the concept of both a man and a woman, in that order. If 'JOHN' is a man, and 'MARY' is a woman, then the concept 'Man×Woman' is true of the ordered pair (JOHN, MARY). It is also possible to define a Cartesian product of two roles, yielding a role.

Concept—In Description Logic, a 'concept' is a unary predicate. That is, it is a property that can be said to hold of an entity. Example: We may represent the idea of being a musician by naming a DL concept 'Musician' or 'IsAMusician', so that to express that individual x is a musician, we would say '(x)Musician' or '(x)IsAMusician', depending on which we choose. DL concepts are conventionally given names that begin with a capital letter.

Concept Inclusion Relation—A relation between two concepts that expresses that every individual described by the first concept is also described by the second. (It is also possible to define a role inclusion relation, in which every ordered pair (x, y) of individuals described by the first role is also described by the second role.) Example: Given the concepts 'IsToaster' and 'IsAppliance', referring to being a toaster and being an appliance, respectively, we can express that everything that is a toaster is an appliance by saying that the concept 'IsToaster' is included in the concept 'IsAppliance', symbolized 'IsToaster⊑IsAppliance'. (In Description Logic terminology, this is usually called 'subsumption', with the first concept being subsumed in the second; IsToaster is subsumed by IsAppliance. We are avoiding this terminology here to reduce confusion.) The same inclusion relation may be expressed 'IsAppliance⊒IsToaster'.

Content/Entity Tag—Document mark-up that abstracts myriad terminology that describes a concept. For instance, "U.S. President", "President of the United States", and "POTUS" are all terms that refer to the conceptual term "President". Content and Entity tags simplify search and discovery of concepts within a corpus of documentation.

Data and Knowledge Model (DKM)—The model that encapsulates the concepts of document formatting structure, authorities, functions, references, RDL logic, and concepts/entities that constitute the ontological representation of legal, policy, and compliance documentation for application within the Law and Policy Compliance Knowledge System.

Deontic Inclusion Relation—In RDL, an inclusion relation that involves a deontic operator. Often, this expresses that an entity, represented as a concept, is included in a permitted or obligated action, represented as a permitted or obligated concept. Example: To express that children are obligated to be accompanied by an adult, we might define the concepts 'Child' and 'IsWithAdult', and then write the deontic inclusion relation 'Child⊑O(IsWithAdult)'. To say people are not allowed to swim, we might define the concepts 'Person' and 'Swim' and write 'Person⊑O(¬Swim)' or 'Person⊑¬P(Swim)' ("Persons are obligated not to swim" or "Persons are not permitted to swim," respectively; the symbol '¬' represents negation.)

Deontic Logic—A form of logic concerned with obligation and permission.

Deontic Term—Any word or phrase referring to the ideas of obligation and/or permission, such as: may, require, requirement, permit, permission, authority, authorize.

Description Logic (DL)—A family of formal knowledge representation languages used for formal reasoning on the concepts of an application domain. Description Logic models concepts, roles, individuals, and their relationships, providing a formalism for ontologies.

Descriptive Document Tag—Document mark-up that annotates documents, sections, or sentences with supplementary conceptual information. Examples of Descriptive Document Tags include Titles, Signatories, Effective or Approved Dates.

Document Format Structure—Document mark-up that organizes a document into its fundamental components. Document Format Structure includes sections, headers, footers, page numbers, and other such basic structural components.

Document Knowledge Base (DKB)—The repository that maintains both the original document and concomitant structured and marked-up digitization of the original document.

Existential Restriction—A particular way to combine a DL concept ('C') and a DL role ('R') to construct a second DL concept. The latter DL concept is symbolized '∃R.C'. This concept holds for some individual x [that is, '(x)∃R.C'] provided there is at least one individual y for whom '(x)R(y)' holds and '(y)C' holds. This can be thought of as "R some C." Example: Given the concept 'Male' to refer to being male and the role 'isMotherOf' to mean being the mother of [someone], we can form the concept '∃isMotherOf.Male' to mean "is mother of some male." For example, if 'MARY' is a woman named Mary, and we assert that '(MARY) ∃isMotherOf.Male', then we are saying that Mary has at least one son.

Factual Relationship—For the purposes of this specification, a 'factual relationship' is any rule assertion, viewed as a relationship among legal entities and actions, modeled as a statement in symbolic logic. For example, if a rule states that 'dogs are defined to be pets,' (which relates dogs to pets, asserting the relationship to be a fact), then that is a factual relationship. It may be modeled as a symbolic logic statement such as 'Dog⊑Pet', so both the original rule and the logic statement can be referred to as a 'factual relationship.'

Formatting and Structure Tag—Document markup that identifies fundamental aspects of the physical structure, organization, and visual representation of a document to include, but not limited to, typeface, font size, bolding, italicization, underlining, page numbers, headers, footers, paragraph ordering, and pagination.

Functional Tag—Document mark-up describing finer-grained legal or policy functions that pertain to a given document (or section of a document).

Identifier—Any string of letters or other symbols used to represent anything. Identifiers should be chosen in a meaningful way so that the identifier easily reminds a reader of what the identifier represents. For example, to represent the idea of employment as a role between two individuals, the string of letters 'isEmployerOf' can be used because that string of letters uses English words that clearly indicate what is being referred to.

Inverse—See Role Inverse Operator.

Knowledge (k) Operator—The symbol 'k' in RDL, used to convert a concept 'C' into the role of 'being known to be or to do C by [someone].' Example: If 'IsDangerous' is the concept of being dangerous, then 'k(IsDangerous)' is the role of being known to be dangerous by [someone], and '(x)k(IsDangerous)(y)' means x is known to be dangerous by y. Additional Information: The role inverse of the knowledge operator is symbolized 'k⁻'; it yields the role inverse of what the knowledge operator yields. For example, '(x)k⁻(IsDangerous)(y)' means that y is known to be dangerous by x (rather than x known by y).

Knowledge Relation—A relation in RDL stated using the RDL knowledge operator ('k') or its role inverse. See 'relation', 'knowledge operator'.

Knowledge Role—A role in RDL that represents 'being known to be or to do [a concept] by [someone].' If 'C' is the concept, then the role of being known to be or to do 'C' is represented as 'k(C)'—see 'Knowledge Operator'.

Legal Action—In the present context, any action about which a legal or policy statement can be made. We distinguish between legal 'entities' and legal 'actions'; entities perform actions. For example, a legal or policy statement might describe an action that is permitted or prohibited of some entity.

Legal Entity—In the present context, anything that can play the role of a subject or object within a legal or policy statement—usually, an individual person or thing, or a group of persons or things. We distinguish here between legal 'entities' and legal 'actions'; entities are often actors. Both can be DL 'concepts.'

Linking Verb—Any form of the verb "be": is, are, was, were, am, be, being, been.

Logic Term—In the present context, any word or phrase that expresses a logic operation, such as negation, conjunction, disjunction, or implication. Examples: not, and, or, if, then, except, exception, unless.

Modal Logic—A type of formal logic that extends propositional and predicate logic to include expressions of modality.

Modal Term—In the present context, any word or phrase that functions as an adverb and expresses a notion of moral imperative, such as: shall, should, will, would, must. More generally, 'modal terms' may also include deontic terms (permission/obligation) and alethic terms (necessity/possibility).

Obligation (O, o) Operators—The symbols 'O' and 'o' in RDL. The concept-obligation operator ('O') is used to convert a concept 'C' into the concept of 'being obligated to be or do C'. The role obligation operator ('o') is used to convert a role 'R' into the role of 'a first individual being obligated to relate to a second individual via R'. Example: If 'FileTaxes' is the concept of filing taxes, then 'O(FileTaxes)' is the concept of being obligated to file taxes. If 'paysRentTo' is the role of paying rent to [someone], then 'o(paysRentTo)' is the role of being obligated to pay rent to [someone]. The role inverse of 'o', symbolized 'o⁻', is defined so that 'o⁻(R)' is the role inverse of 'o(R)'. Example: Continuing the above example, 'o(paysRentTo)' means being obligated to pay rent to, i.e., owing rent to, but 'o⁻(paysRentTo)' means being owed rent from.

Obligatory Concept—A concept in RDL that represents 'being obligated to be or to do' another concept. If is the other concept, then the obligation to be or to do is an obligatory concept (represented as 'O(C)'—see 'Obligation Operators').

Ontology—A systematic representation (such as within a computer) of knowledge about a given domain, taking the form of conceptual classes that are connected by relationships, as in a hierarchy or other network. In particular, an ontology models common features and relationships of items in the domain. Example: An ontology pertaining to documents might include a class 'Document', a class 'Title', and a relationship 'hasAtTheBeginning' between them to indicate that every document has a title at the beginning. (This might, for instance, be stated formally as "Document hasAtTheBeginning some Title.") Ordinarily, an ontology would not merely say that a particular document has a particular title at the beginning, but rather, that documents consistently have titles at the beginning.

Ontology Class—A named set of individuals within a given domain of knowledge. Generally, the individuals have a common feature, and the class is named in terms of that feature. Example: An ontology about business might define a class "Employees" to represent employees and a class "Managers" to represent managers.

Ontology Class Equivalence Relationship—In an ontology, a class C is equivalent to a class D if and only if all members of the class C are also members of the class D and all members of the class D are also members of the class C. The fact of one class being an equivalent to another is called an 'ontology class equivalence relationship' here.

Ontology Subclass Relationship—In an ontology, a class C is a subclass of a class D if and only if all members of the class C are also members of the class D. The fact of one class being a subclass of another is called an 'ontology subclass relationship' here.

Ontology Property—A named relationship that can hold between classes in an ontology. Example: In an ontology about business relationships, a class called "Managers" may have the property "hasAsSubordinate" relative to the class "Employees", expressed as "Managers hasAsSubordinate only Employees" (to indicate that all subordinates of managers are employees). Although when speaking of ontologies, the term 'property' is sometimes used to mean simply an attribute/feature/characteristic of members of a class, in the present context the term 'property' is used in the sense of a relationship between classes.

Permission (P, p) Operators—The symbols 'P' and 'p' in RDL. The concept-permission operator ('P') is used to convert a concept 'C' into the concept of 'being permitted to be or do C'. The role permission operator ('p') is used to convert a role 'R' into the role of 'a first individual being permitted to relate to a second individual via R'. Example: If 'BuildHouse' is the concept of building a house, then 'P(BuildHouse)' is the concept of being permitted to build a house. If 'collectFeeFrom' is the role of collecting a fee from [someone], then 'p(collectFeeFrom)' is the role of being permitted to collect a fee from [someone]. The role inverse of the operator 'p', symbolized 'p$^-$', is defined so that 'p$^-$(R)' is the role inverse of 'p(R)'. Example: Continuing the above example, 'p(collectFeeFrom)' means a first person is permitted to collect a fee from a second, but 'p$^-$(collectFeeFrom)' means the second person is permitted to collect a fee from the first.

Permitted Concept—A concept in RDL that represents 'being permitted to be or to do' another concept. If 'C' is the other concept, then the permission to be or to do 'C' is a permitted concept (represented as 'P(C)'—see 'Permission Operators').

Quantifier Term—Any word or phrase that functions as an adjective and indicates an amount of the thing that is modified, such as: all, any, every, each, some, only, no, none.

Referential Tag—Document mark-up that associates citations and references within one document to another document section (to include both intra-document and inter-document references).

Relation, Relationship—The word "relationship" here is generally used in its usual, generic, nontechnical sense, to mean some property that holds between two individuals or things. The word "relation" is more technical. Essentially, a "relation" is a relationship that is defined precisely and represented symbolically in a logic statement. Example: The fact that birds are animals is a relationship between birds and animals. If we define corresponding concepts Birds and Animals, then we may express that relationship, the inclusion of the concept of Birds in the concept of Animals, by means of the inclusion 'relation', which is symbolized '$\sqsubseteq$'. Hence, we may express that 'Birds$\sqsubseteq$Animals'. We may therefore refer to the latter expression as either a relationship or a relation.

Restrictions—Universal and existential restrictions in Description Logic, which combine DL concepts and DL roles to create other DL concepts.

Role—In Description Logic, a 'Role' is a binary predicate. That is, it is a relationship that can be said to hold between two entities. Example: The idea of fatherhood may be represented by naming a DL role 'isFatherOf', so that to express that individual x is the father of individual y, it can be said '(x)isFatherOf(y).' DL roles are conventionally given names that begin with a lowercase letter.

Role Inverse (R$^-$)—Given a role 'R' in RDL, its inverse (its 'role inverse') 'R$^-$' is the role that is the same as the original role, except that it applies to the related individuals in the reverse order. Example: If 'isAChildOf' is the role of being a child of [someone], then '(x) isAChildOf(y)' means x is a child of y, but '(x)isAChildOf$^-$(y)' (note the minus sign representing role inverse) means y is a child of x. If we also have 'isAParentOf' to mean the role of being a parent of [someone], then 'isAChildOf' and 'isAParentOf' are role inverses of each other. Symbolically: 'isAChildOf$^-$≡isAParentOf', and 'isAChildOf≡isAParentOf$^-$'.

Rule Description Logic (RDL)—An improved version of description logic. Notable features of RDL are its deontic operators of permission (P, p) and obligation (O, o), and its assignment (a) and knowledge (k) operators.

Rule Description Logic (RDL) Axioms—The basic assumptions of Rule Description Logic. These include, for example, that 'O(C)≡¬(¬C)', meaning that obligation to perform an action C is the same as a nonpermission not to perform the action C. Another is '∃a(C).T$\sqsubseteq$C', meaning roughly that if a condition C is legally assigned by someone to be true, then it is in fact legally true.

Rules Knowledge Base (RKB)—The repository that contains the logical formulations that represent the logical content of legal, policy, and compliance documents. A link is maintained between the logical formulations within the RKB with their respective documents stored within the DKB.

Rule statement (Legal, Policy, Compliance)—Legal, policy, and compliance documents place constraints on individuals by carefully defining terms and then using the terms to express permissions or obligations that people have when they are under the authority of such documents. Many sentences in such documents are therefore either definitions or requirements imposed on those individuals (or combinations of such statements). For the purposes of this specification, any such sentences that include definitions and requirements are considered to be legal, policy, or compliance 'rule statements.'

Semantic Qualifier Term—For purposes of this specification, a 'semantic qualifier term' is a word or phrase in a legal, policy, or compliance text whose meaning is either commonly represented as a first-order logic symbol (e.g., equivalence, inclusion, intersection, union, or complement) or else indicates the existence or non-existence of a legal ability, authority, or constraint (e.g., a word such as "can," "should," "may," or "must"). These include linking verbs, modal terms, Alethic terms, Deontic terms, and quantifier terms.

Ternary Relationship—A relationship among three entities. In the present context, this applies in particular to RDL relationships defined by the assignment and knowledge operators ('a' and 'k', respectively). Example: If 'IsCitizen' is the concept of being a citizen, if 'ROBERT' is a person, and 'JUDGE' is a judge, then those three entities might be related by the expression '(ROBERT)a(IsCitizen)(JUDGE)' to say that JUDGE awards (i.e., "assigns") citizenship to ROBERT.

Top Concept—Symbolized 'T' in DL, this is the concept that holds for all individuals. That is, if x is any individual, then '(x)T' is true.

Universal Restriction—A particular way to combine a DL concept ('C') and a DL role ('R') to construct a second DL concept. The latter DL concept is symbolized '∀R.C'. This concept holds for some individual x [that is, '(x)∃R.C'] provided that for all y for whom '(x)R(y)' holds it is also the case that '(y)C' holds. This can be thought of as "R only C." Example: Given the concept 'Male' to refer to being male and the role 'isMotherOf' to mean being the mother of [someone], we can form the concept '∀isMotherOf.Male' to mean "is mother of only male(s)." For example, if 'MARY' is a woman named Mary, and we assert that '(MARY) ∀isMotherOf.Male', then we are saying that Mary has only sons. (To be precise, "Mary is the mother of only males" here means that either Mary has children, all of whom are male, or else she has no children at all. The second part makes some sense, because if Mary has no children, then it is not actually wrong to say that any children she has are male.)

In order to better understand the present invention, the following is a summary of Rule Description Logic symbols. "Rule Description Logic" (RDL) is a symbolic logic language designed for expressing laws and policies (i.e., "rules"). RDL was created for use with the invention described here. It consists of both symbols for expressing the logic of rule statements themselves and punctuation symbols used to separate statements or to set off comments. The logical symbols of RDL primarily consist of the standard symbols from description logics and a few nonstandard ones, which are used to make statements about description logic 'concepts' and 'roles', to which are added six more operators: P and p ("permission"), O and o ("obligation"), a ("assignment"), and k ("knowledge"). Each RDL operator operates on a concept or a role (depending on the operator) and yields a concept or a role. For example, the P operator, one of the permission operators, operates on a concept and yields a concept. If C is a concept representing an action, then P(C) is also a concept, namely, the concept of being permitted to perform the action C. (The expression 'P(C)', read "P of C", is the 'output' of applying the P operator to C.) This resulting concept P(C) can then be handled in logic statements the same way as any other description logic concept.

Logic symbols from description logic used in RDL: ≡ ⊑ ⊒ ⊤ ⊥ ⊓ ⊔ ¬ ∀ ∃. ≤1 =1 × ⁻ ⊨ ( )

Operators used in RDL: P O p o a k

Additional symbols (punctuation) for RDL logic files: /* */ \ : , ;

Logic Symbols can be Used as Follows:

In the following, C and D are concepts. R and S are roles:

C≡D Is the same concept as. Car≡Automobile

C⊑D Concept is contained in/is a kind of/implies concept. Dog⊑Animal.

C⊓D Concept intersection (both C and D are true) Bachelor≡Unmarried⊓Man

C⊔D Concept union (C is true, or D is true, or both C and D are true) Parent≡Father⊔Mother ¬C Concept negation. Child≡Person⊓¬Adult ⊤ "Top" concept (universal set). Holds for all individuals ⊥ "Bottom" concept (empty set). Holds for no individuals C×D Cartesian product operation. Combines two concepts into a single concept that holds for exactly those pairs of individuals for which C and D are true, in that order. (FELIX, REX)[Cat×Dog] is true if and only if both (FELIX)Cat and (REX)Dog are true. A Cartesian product of two roles may also be defined (yielding a role)

R≡S Is the same role as. hasJob≡hasOccupation

R⊑S Role is contained in/is a kind of/implies role. hasAsFather⊑hasAsParent

R⊒S Role contains/is implied by role. hasAsChild ⊒hasAsSon

R⁻ Role inverse operator ("⁻"). Exchanges the two arguments in a role expression, so that "(y)R⁻(x)" means the same thing as "(x)R(y)". hasAsAChild⁻≡hasAsAParent ∀R.C Universal restriction. "R (if any) only C". ∀hasAsChild.Male means "hasAsChild (if any) only Males," i.e., having only sons or no children at all ∃R.C Existential restriction. "R some C", or "R at least one C". ∃hasAsChild.Female means "hasAsChild at least one Female," i.e., has at least one daughter ≤1R Having at most one filler for role R. City ⊑≤1hasAsMayor =1R Having exactly one filler for role R. House ⊑=1hasAsAddress ⊨ Entailment. (SOCRATES)Man, Man⊑Mortal ⊨ (SOCRATES)Mortal The Following are Examples of Operators:

P(C) Concept-permission operator (of concept, yields concept). Is legally permitted to be or do C. Children ⊑P(AdmittedWithAdult)

O(C) Concept-obligation operator (of concept, yields concept). Is legally required to be or do C. Pets ⊑O(BeOnLeash)

p(R) Role-permission operator (of role, yields role). Is legally permitted to relate to [someone] by role R. p(acceptGiftFrom)

o(R) Role-obligation operator (of role, yields role). Is legally required to relate to [someone] by role R. o(payRentTo)

a(C) Assignment ("assigned-to-be") operator (of concept, yields role). Individual is officially assigned to be or do C by [someone]. ∃a(ScholarshipRecipient).College means "assigned by some college to be a scholarship recipient."

k(C) Knowledge ("known-to-be") operator (of concept, yields role). Individual is officially known to be or do C by [someone]. ∀k(Informant).Police means "known to be an informant only by police."

p⁻(R), o⁻(R); a⁻(C), k⁻(C) Operator role inverses (same type of input as original operators, yield roles). The operators above that yield roles (namely, p, o, a, and k) have corresponding operator role inverses (the operators p⁻, o⁻, a⁻, and k⁻, respectively). These yield the role inverses of the outputs of the original operators. For example, o⁻(R)≡[o(R)]⁻, and therefore, (x)o⁻(R)(y)≡(y)o(R)(x). Thus, (ANN)o(pay)(BOB) means Ann is obligated to pay Bob, but (ANN)o⁻(pay)(BOB) means Bob is obligated to pay Ann, the same as (BOB)o(pay)(ANN)

A paragraph in a legal or policy document may translate into one or more rule statements in logic. For example, "All birds are permitted to fly, and all fish are obligated to swim," may be translated as follows: Bird⊑P(Fly), Fish⊑O(Swim). It is conceivable that yet other symbols could be incorporated into the system.

The present invention is an improved form of Description Logic (DL), to include additional definitions and axioms for the named operators P, O, p, o, a, and k as follows:

For "deontic" operators (P, O, p, o), the present invention assumes that a DL role exists that is called "isPermitted", for which "(x)isPermitted(y)" means that individual x is permitted to be individual y.

The present invention defines P: concepts→concepts by, "For any individual x and concept C: (x)P(C) if and only if (x)∃isPermitted.C".

The present invention defines O: concepts→concepts by, "For any concept C: O(C)≡¬P(¬C)".

The present invention defines p: roles→roles by, "For any individuals x and y and any role R: (x)P(R)(y) if and only if (x)P(R(y))" (where 'R(y)' is understood to be the concept of relating to y by R; (x)[R(y)] holds if and only if (x)R(y) holds).

The present invention defines o: roles→roles by, "For any role R: o(R)≡¬p(¬R)" (where '¬R' is understood to be the role that is true of a pair of individuals if and only if it is false for R applied to those two individuals). To these relationships is added a single axiom, "⊤⊑ε isPermitted.⊤", meaning every individual is permitted to be someone (or do something). This prevents situations in which a person is obligated both to perform an action and not to perform the same action at the same time.

The present invention defines operators a: concepts→roles and k: concepts→roles to mean what they are defined above to mean ('a' is for assignment, and 'k' is for knowledge). An axiom is asserted for both 'a' and 'k': "For any concept C: ∃a(C).⊤⊑C" (the 'assignment axiom'), and "For any concept C: ∃k(C).⊤⊑C" (the 'knowledge axiom'). These state, respectively, that if it is officially assigned (i.e., by someone having the authority to do so) that an individual is described by concept C, then that person really is described by that concept C; and if it is officially known that an individual is described by a concept C, then that person really is described by that concept C. These operators are known as "effectuation" operators because they bring about an effect that a particular relationship holds. For example, "εa(AGraduate).College⊑AGraduate", means that anyone who is assigned to be a graduate by some college really is a graduate. The official assigning of a person by a college to be a graduate "effectuates" the relationship that the person really is a graduate.

The present invention discloses a system that enables users to easily search and discover a wide range of content and relationship information—ideas, concepts, semantic, hierarchical, referential, and logical relationships—within a set of documents which includes, but is not limited to, legal, policy, and compliance documents. The system enables users to vary what types of information may be accessed from the legal, policy, and compliance documents by mapping documents into a reconfigurable data and knowledge model (DKM). Users can easily do so by using a standardized, machine readable format.

The system includes a Rules Knowledge Base (RKB) and a Document Knowledge Base (DKB). The DKB is distinct from the RKB. The system has a single interface to enable users to search for concepts, documents, keywords, entities, relationships, as well as reason through logical content within the RKB and DKB. The system maintains links between different representations of each document across the RKB and DKB, maintaining the pedigree of the document information within the system.

Document Knowledge Base (DKB)

The system enables machine-driven processing and automation of document, structural and referential features by using the DKM to break documents into those features—titles, sections, section titles, authors, dates of issuance, internal references, and external references. Additionally, the system provides a method for users to process and store legal, policy, and compliance documents, stepping users through a process whereby documents are digitized and aligned to the DKM. When new documents are added to the system, the system extracts entities, instances, and concepts from documents for search and navigation by using terms that are already tagged in earlier documents. The system also provides users with the ability to expand and individualize available document data. It does so by enabling users to add tags, entities, and additional mark-up to documents stored within the DKB. Upon user request, the system will also reconstruct documents section-by-section, so the user may view the full document both textually and graphically and may select from it specific document sections or document tags to view.

The system maintains document data (other than logic data) by storing tagged, machine-readable documents that are mapped to the DKM within the Document Knowledge Base. The system also provides users with a graph by using references to construct a "hierarchy" of document sections. This document hierarchy generation can produce graphs of three types of references: document-to-document references, section-to-section references, and sentence-to-sentence references. Additionally, the system is able to provide both inter- and intra-document hierarchical referencing information to the user as generated by the document hierarchy.

The system also constructs a conceptual hierarchy using entities and instances extracted from documents. Searches will return concept associations both textually and graphically. The system is able to provide both inter- and intra-document referencing of concepts to the user as generated by the conceptual hierarchy. Users can also obtain a historical timeline of documents by using extracted document dates of issuance and dates of expiration to create a chronological graph of the evolution of the document set.

The present invention also enables faceted browsing and graphical representations across combinations of concepts and references, utilizing the data and knowledge model (DKM) as the conceptual framework to structure the user's navigation through the document set.

Documents stored in DKB are also linked to their respective original, canonical documents and in this way associate the original documents with results returned from searches or displayed hierarchically in graphical visualizations. Documents are also uniquely identified by the system by means of hash value tags, enabling authentication of the electronic copies of documents that have been converted into machine-readable form. The system architecture enables both human users and automated downstream systems to extract and export user-selected or downstream-system-selected documents, sections, references, concepts, relationships, and graphical representations.

Rules Knowledge Base (RKB)

The system stores logical formulations of documents, as represented in Rule Description Logic, within a Rules Knowledge Base (RKB). For example, the system can provide knowledge of logical relationships of policies and laws by converting policy and legal document sections into logical formulations (that is, logical statements written in logic symbols) expressed in Rule Description Logic. The system provides an interface that highlights documents within the DKB, tagging actors and their respective obligations and permissions, to enable fast conversion of policy and legal documents into logical formulations. Users can reason through the logical content of law, policy, and procedures in an automated manner, using automatic reasoning software that processes through the logical formulations in terms of Rule Description Logic.

The system provides users with a "Guided Questionnaire" about the legal and policy procedures required to be performed according to a given set of rules; it does so using logical formulations. The Guided Questionnaire asks questions to users, and then the system uses users' choices to generate queries to the RKB. When providing a user with legal, policy, and compliance requirement information generated following the Guided Questionnaire, the system returns an accompanying justification of the result—that is, a description of the flow of the logic to reach the conclusion provided, together with references to the specific laws, policies, and procedures that were used to draw the conclusion. Additionally, the system provides awareness to the user of inconsistencies and contradictions within rules by using the logical formulations in terms of Rule Description Logic. The present invention also enables automated downstream systems to interface with this system to query logical formulations in the RKB for dynamic and automatic processing of rules derived from laws, policies, and procedures.

FIG. 1 discloses a method for generating a rule ontology comprising the steps of generating at least one structured document 10, preparing the at least one structured document for a logic conversion 11, generating at least one logic statement using a logic language 12, converting the at least one logic statement into a rule ontology 13, and linking said rule ontology with a reference to said at least one rule statement 14.

Figure 2:
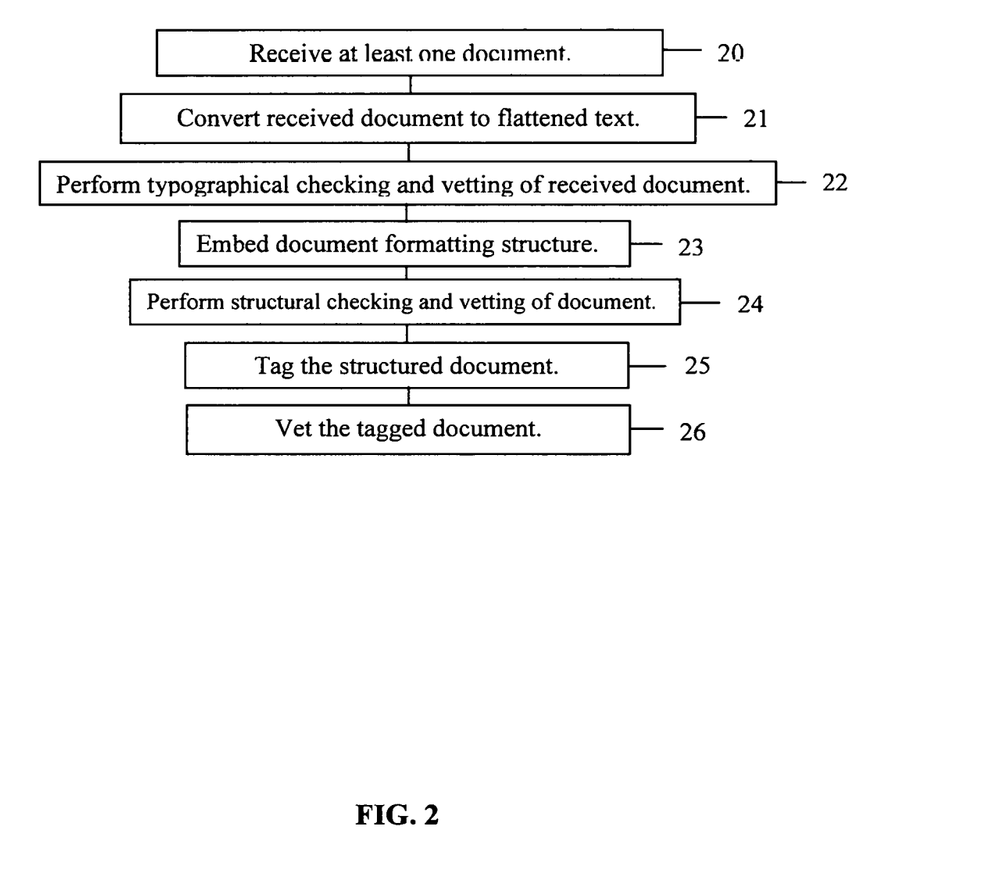
FIG. 2 discloses the process of generating a structured and tagged document.

As disclosed in FIG. 2, generating a structured document begins with receiving electronic copies of at least one document 20 which include, but are not limited to, legal, policy, and compliance documents. Documents received are converted to flattened text 21. Once converted, the document then undergoes a typographical checking and vetting process where the flattened text is checked to confirm, among other things, that misspellings are corrected, that no extraneous characters are present, and that no portions of the document are missing 22. The document is also embedded with formatting and structure utilizing formatting and structure tags 23. Formatting and structure tags include, but are not limited to, tags that identify typeface, font size, bolding, italicization, underlining, page numbers, headers, footers, paragraph ordering, pagination, and other such fundamental aspects that constitute the physical structure, organization, and visual representation of a document. Finally, the formatted document undergoes a structural checking and vetting process to verify that the text conversion and application of a document structure are accurate and true to the original format of the document 24.

The process of preparing the structured document for logic conversion includes tagging said structured document with a plurality of tags wherein the plurality of tags are selected from a group of tags consisting of a descriptive document tag, a referential tag, an authority tag, a functional tag, and an entity tag 25. Vetting and approval of these additional tags is also performed to verify that the tags accurately reflect the respective conceptual information that each tag notates within said structured document 26.

Figure 3:
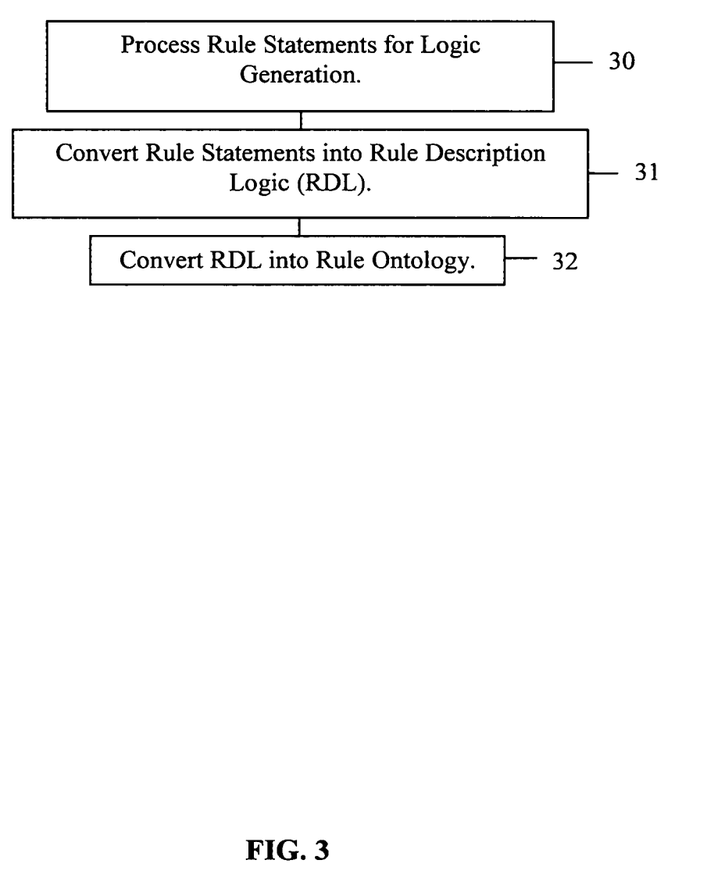
FIG. 3 discloses the high-level process for preparing a structured document for logic conversion, generating logic statements, and generating a rule ontology.

FIG. 3 discloses the high-level process for preparing a structured document for logic conversion 30, generating logic statements 31, and generating a rule ontology 32.

Figure 4:
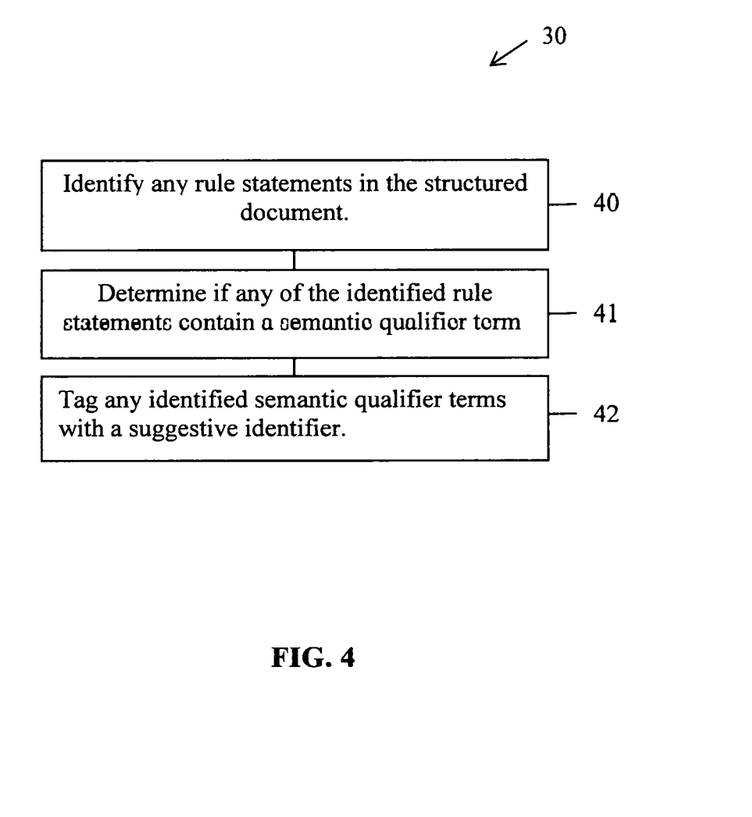
FIGS. 4-6 disclose a detailed portrayal of FIG. 3 to prepare a structured document for logic conversion, generating logic statements, and generating a rule ontology.

FIG. 4 outlines preparing a structured document for logic conversion 30. First, the structured document is assessed for rule statements including but not limited to legal statements, policy statements, and compliance statements 40. Any identified rule statements are then assessed to determine if they contain a semantic qualifier term (e.g., logical terms, linking verbs, modal terms, alethic terms, deontic terms, and quantifier terms) 41. Where a semantic qualifier term is identified, the semantic qualifier term is then tagged with a suggestive identifier 42 including but not limited to highlighting the semantic qualifier term in a particular color based on the type of the semantic qualifier term identified.

Figure 5:
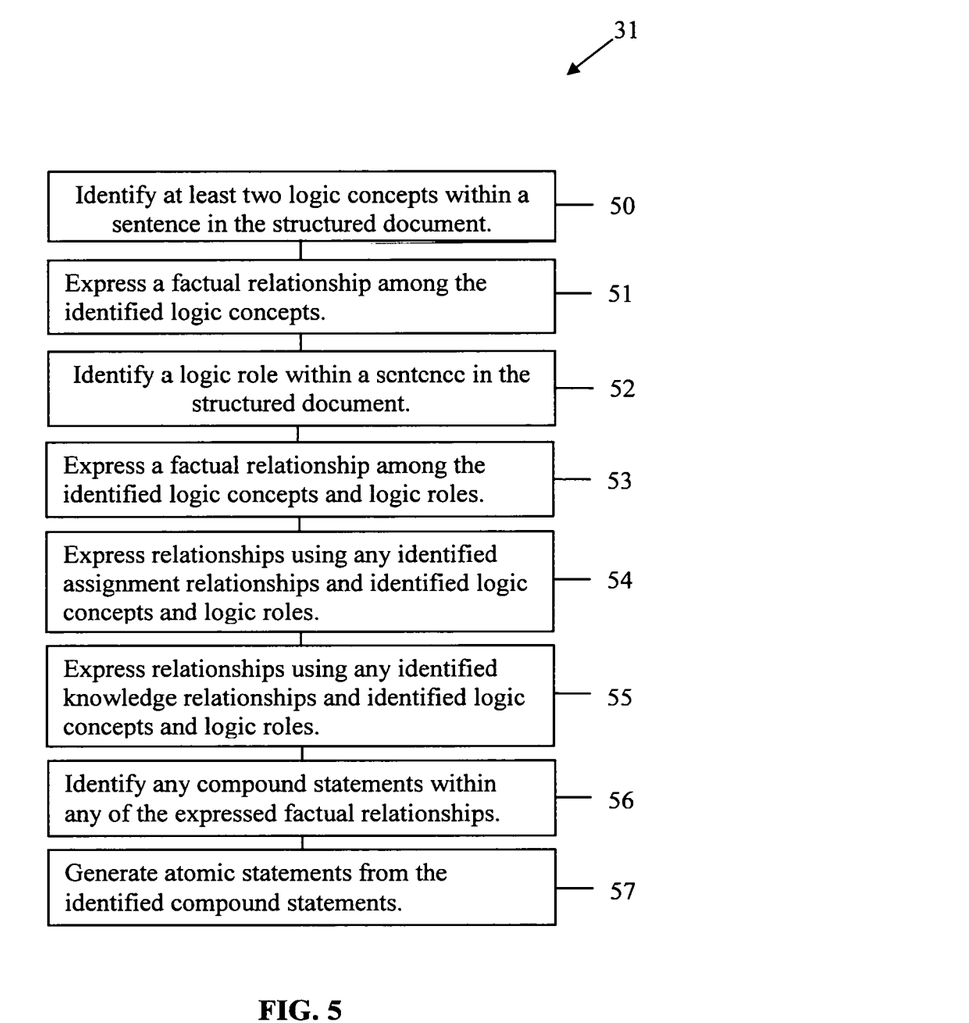

FIG. 5 discloses generating at least one logic statement using a logic language such as Rule Description Logic (RDL) 31. The structured document is assessed to determine if it contains at least two logic concepts which include atomic concepts, Cartesian product of atomic concepts, universal restrictions, existential restrictions, obligatory concepts, and permitted concepts 50. Where the structured document contains at least one sentence relating at least two logic concepts, a factual relationship is expressed among the two logic concepts 51. Next, the system determines whether the structured document contains a logic role which includes atomic roles, Cartesian product of atomic roles, and the role inverses of atomic roles 52. Where the structured document contains at least one sentence relating at least two logic concepts and a logic role, at least one factual relationship is expressed among the logic concepts and the logic role identified 53.

Next, if the structured document contains an assignment relationship, a factual relationship is expressed using the assignment relationship and logic concepts and logic roles identified earlier 54. Similarly, if the structured document contains a knowledge relationship, a factual relationship is expressed using the knowledge relationship and the logic concepts and logic roles identified 55. Once these factual relationships are expressed between the various logic concepts and roles as described earlier, the present invention also assesses these factual relationships to identify any compound statements contained within 56. A plurality of atomic statements is then generated from the identified compound statements 57.

Figure 6:
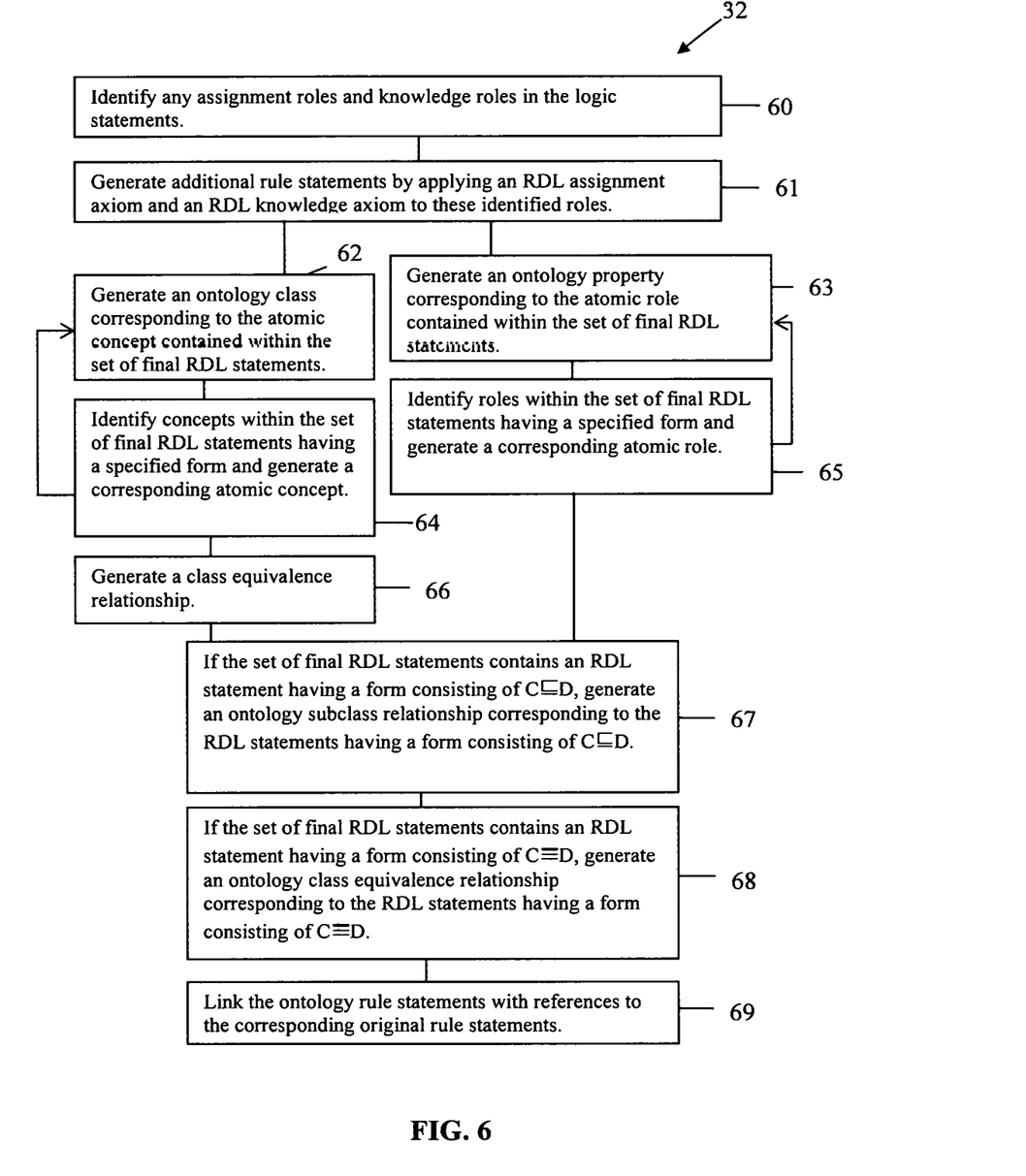

FIG. 6 discloses converting the plurality of logic statements into a rule ontology 32. Any assignment roles and knowledge roles in the logic statements are identified 60 and additional rule statements are generated by applying an RDL assignment axiom and an RDL knowledge axiom to these identified roles 61. If the set of final RDL statements contains an atomic concept, an ontology class corresponding to the atomic concept is generated 62. Additionally, if the set of final RDL statements contains an atomic role, an ontology property corresponding to the atomic role is generated 63.

Next, the system identifies concepts within the set of final RDL statements having a form including $\neg C$, $C \sqcap D$, $C \sqcup D$, $\exists R.D$, and $\forall R.D$, where C and D are atomic concepts, and R is an atomic role, and generates a corresponding atomic concept which then replaces the concept originally identified 64. Additionally, an ontology class corresponding to the generated atomic concept is generated 62. The present invention also generates a class equivalence relationship within the rule ontology between an ontology equivalent of the form of the identified concept and the ontology equivalent of its atomic concept 66.

The system also identifies concepts within the set of final RDL statements having a form including P(C), O(C), and C×D, where C and D are atomic concepts, and generates a corresponding atomic concept which then replaces the concept originally identified and is used to generate an ontology class 64.

Additionally, the system identifies a role within the set of final RDL statements having a form including $R^-$, p(C), o(C), a(C), k(C), $p^-(C)$, $o^-(C)$, $a^-(C)$, and $k^-(C)$, where C and D are atomic concepts, and R is an atomic role, and generates a corresponding atomic role which then replaces the role originally identified 65. An ontology property is generated corresponding to the atomic role 63.

If the set of final RDL statements contains an RDL statement having a form consisting of $C \sqsubseteq D$, generate an ontology subclass relationship corresponding to the RDL statements having a form consisting of $C \sqsubseteq D$, where C and D are atomic concepts 67. Similarly, if the set of final RDL statements contains an RDL statement having a form consisting of C≡D, generate an ontology class equivalence relationship corresponding to the RDL statements having a form consisting of C≡D, where C and D are atomic concepts 68.

Moreover, when the ontology relationships just described have been generated—in the form of ontology rule statements—the system links the ontology rule statements with references to the corresponding original (legal, policy, compliance) rule statements 69. These labels provide document or document section information, so a user is able to see the relationship between the rule and its translation into the ontology.

Although the present embodiment of the invention has been described in detail and was created for use with legal, policy, and compliance statements, it should be understood that a variety of modifications and substitutions can be made therein without departing from the spirit and scope of the invention as defined by the claims. It should be understood that the methods disclosed in this specification can be implemented in digital electronic circuitry, or in computer software, firmware, or hardware. The methods disclosed can also be implemented as one or more computer programs, i.e. one or more modules of computer program instructions encoded on a tangible program carrier for execution by or to control the operation of a data processing apparatus. The tangible program carrier can be a computer readable medium such as a machine-readable storage device, a machine-readable storage substrate, a memory device, or a combination of one or more of them.

What is claimed is:

1. A method for generating a rule ontology, comprising the steps of
   1) generating at least one structured document containing at least one rule statement;
   2) preparing said at least one structured document for a logic conversion;
   3) generating at least one logic statement using Rule Description Logic (RDL) language comprising the steps of;
      a. determining whether the structured document contains at least two concepts;
      b. upon a condition in which the structured document contains at least two concepts is determined to have occurred, determining whether the at least two concepts are members of a group of logic concepts wherein said group of logic concepts consists of an atomic concept, a Cartesian product of atomic concepts, a universal restriction, an existential restriction, an obligatory concept and a permitted concept;
      c. upon a condition in which the structured document contains at least two concepts is determined to have occurred, expressing a factual relationship among the logic concepts, resulting in an RDL statement;
      d. determining whether the structured document contains a role;
      e. upon a condition in which the structured document contains a role is determined to have occurred, determining whether the role is a member of a group of logic roles wherein said group of logic roles consists of an atomic role, a Cartesian product of atomic roles, and a role inverse of an atomic role;
      f. upon a condition in which the structured document contains at least two concepts and the structured document contains a role is determined to have occurred, expressing at least one factual relationship among the logic concepts identified in step (b) and the logic roles identified in step (e) resulting in an RDL statement;
      g. upon a condition in which the structured document contains an obligatory concept or the structured document contains a permitted concept is determined to have occurred, expressing a set of factual relationships among said obligatory concept or said permitted concept and the logic concepts identified in step (b) resulting in an RDL statement;
      h. determining whether the structured document contains an assignment relationship;
      i. upon a condition in which the structured document contains an assignment relationship is determined to have occurred, expressing a factual relationship using the assignment relationship and the logic concepts identified in step (b) resulting in an RDL statement;
      j. determining whether the structured document contains a knowledge relationship;
      k. upon a condition in which the structured document contains a knowledge relationship is determined to have occurred, expressing a factual relationship using the knowledge relationship and the logic concepts identified in step (b) resulting in an RDL statement;
      l. determining whether the results of steps (a)-(k) contain a compound statement; and
      m. upon a condition in which the results of steps (a)-(k) contain a compound statement is determined to have occurred, generating a plurality of atomic statements from the compound statement, 4) providing at least one of said resulting RDL statements to a logic-to-ontology converter to convert said at least one of said RDL statements to a rule ontology; and
5) linking said rule ontology with a reference to said at least one rule statement.

2. The method of claim 1 wherein the step of expressing at least one factual relationship among the logic concepts identified in step (b) and the logic roles identified in step (e) is expressed using the universal restriction identified in step (b) and an inclusion relation operator.

3. The method of claim 2 wherein the step of converting said at least one of said RDL statements to a rule ontology comprises:
   a. generating an additional RDL statement by applying an assignment axiom to the results of claim 1, step (i);
   b. generating an additional RDL statement by applying a knowledge axiom to the results of claim 1, step (k);
   c. generating a set of final RDL statements wherein said set of final RDL statements comprises the results of steps (a)-(b), claim 1, step (c), claim 1, step (f), claim 1, step (g), claim 1, step (i), claim 1, step (k), and claim 1, step (m);
   d. determining whether the set of final RDL statements contains an atomic concept;
   e. upon a condition in which the set of final RDL statements contains an atomic concept is determined to have occurred, generating an ontology class corresponding to the atomic concept;
   f. determining whether the set of final RDL statements contains an atomic role;
   g. upon a condition in which the set of final RDL statements contains an atomic role is determined to have occurred, generating an ontology property corresponding to the atomic role;
   h. identifying a concept within the set of final RDL statements having a form selected from the group of forms consisting of $\neg C$, $C \sqcap D$, $C \sqcup D$, $\exists R.D$, and $\forall R.D$;
   i. generating an atomic concept for each concept identified in step (h);
   j. replacing the result of step (h) with the atomic concept generated in step (i);
   k. generating a first ontology class corresponding to the generated atomic concept in step (i);
   l. generating a class equivalence relationship within the rule ontology between a second ontology class having the form equivalent to the form of the identified concept in step (h) and the corresponding first ontology class generated in step (k);
   m. identifying a concept within the set of final RDL statements having a form selected from the group of forms consisting of P(C), O(C), and C×D;
   n. generating an atomic concept for each concept identified in step (m);
   o. replacing the concept identified within the final RDL statements in step (m) with the atomic concept generated in step (n);
   p. generating an ontology class using the atomic concept generated in step (n);
   q. identifying a role within the set of final RDL statements having a form selected from the group of forms consisting of $R^-$, p(C), o(C), a(C), k(C), $p^-(C)$, $o^-(C)$, $a^-(C)$, and $k^-(C)$;
   r. generating an atomic role for each role identified in step (q);
   s. replacing the role identified within the final RDL statements in step (q) with the atomic role generated in step (r);
   t. generating an ontology property corresponding to the atomic role generated in step (r);
   u. determining whether the set of final RDL statements contains an RDL statement having a form consisting of $C \sqsubseteq D$;
   v. upon a condition in which the set of final RDL statements contains an RDL statement having a form consisting of $C \sqsubseteq D$ is determined to have occurred, generate an ontology subclass relationship corresponding to the RDL statements having a form consisting of $C \sqsubseteq D$;
   w. determining whether the set of final RDL statements contains an RDL statement having a form consisting of $C \equiv D$; and
   x. upon a condition in which the set of final RDL statements contains an RDL statement having a form consisting of $C \equiv D$ is determined to have occurred, generate an ontology class equivalence relationship corresponding to the RDL statements having a form consisting of $C \equiv D$.

4. The method of claim 3, wherein C and D are atomic concepts, and R is an atomic role.

5. The method of claim 1 wherein the step of expressing at least one factual relationship among the logic concepts identified in step (b) and the logic roles identified in step (e) is expressed using the existential restriction identified in step (b) and an inclusion relation operator.

6. The method of claim 5 wherein the step of converting said at least one of said RDL statements to into a rule ontology comprises:
   a. generating an additional RDL statement by applying an assignment axiom to the results of claim 1, step (i);
   b. generating an additional RDL statement by applying a knowledge axiom to the results of claim 1, step (k);
   c. generating a set of final RDL statements wherein said set of final RDL statements comprises the results of steps (a)-(b), claim 1, step (c), claim 1, step (f), claim 1, step (g), claim 1, step (i), claim 1, step (k), and claim 1, step (m);
   d. determining whether the set of final RDL statements contains an atomic concept;
   e. upon a condition in which the set of final RDL statements contains an atomic concept is determined to have occurred, generating an ontology class corresponding to the atomic concept;
   f. determining whether the set of final RDL statements contains an atomic role;
   g. upon a condition in which the set of final RDL statements contains an atomic role is determined to have occurred, generating an ontology property corresponding to the atomic role;
   h. identifying a concept within the set of final RDL statements having a form selected from the group of forms consisting of $\neg C$, $C \sqcap D$, $C \sqcup D$, $\exists R.D$, and $\forall R.D$;
   i. generating an atomic concept for each concept identified in step (h);
   j. replacing the result of step (h) with the atomic concept generated in step (i);
   k. generating a first ontology class corresponding to the generated atomic concept in step (i);
   l. generating a class equivalence relationship within the rule ontology between a second ontology class having the form equivalent to the form of the identified concept in step (h) and the corresponding first ontology class generated in step (k);

m. identifying a concept within the set of final RDL statements having a form selected from the group of forms consisting of P(C), O(C), and C×D;
n. generating an atomic concept for each concept identified in step (m);
o. replacing the concept identified within the final RDL statements in step (m) with the atomic concept generated in step (n);
p. generating an ontology class using the atomic concept generated in step (n);
q. identifying a role within the set of final RDL statements having a form selected from the group of forms consisting of $R^-$, p(C), o(C), a(C), k(C), $p^-(C)$, $o^-(C)$, $a^-(C)$, and $k^-(C)$;
r. generating an atomic role for each role identified in step (q);
s. replacing the role identified within the final RDL statements in step (q) with the atomic role generated in step (r);
t. generating an ontology property corresponding to the atomic role generated in step (r);
u. determining whether the set of final RDL statements contains an RDL statement having a form consisting of $C \sqsubseteq D$;
v. upon a condition in which the set of final RDL statements contains an RDL statement having a form consisting of $C \sqsubseteq D$ is determined to have occurred, generate an ontology subclass relationship corresponding to the RDL statements having a form consisting of $C \sqsubseteq D$;
w. determining whether the set of final RDL statements contains an RDL statement having a form consisting of C≡D; and
x. upon a condition in which the set of final RDL statements contains an RDL statement having a form consisting of C≡D is determined to have occurred, generate an ontology class equivalence relationship corresponding to the RDL statements having a form consisting of C≡D.

7. The method of claim 6, wherein C and D are atomic concepts, and R is an atomic role.

8. The method of claim 1 wherein the step of preparing said at least one structured document for a logic conversion comprises:
   a. tagging said structured document with a plurality of tags wherein the plurality of tags are defined in a data and knowledge model (DKM) selected from a group of tags consisting of a referential tag, an authority tag, a functional tag, and an entity tag;
   b. identifying a rule statement within the structured document;
   c. determining whether the identified rule statement contains a semantic qualifier term defined in a data and knowledge model (DKM); and
   d. upon a condition in which the identified rule statement contains a semantic qualifier term, tagging said semantic qualifier term with an identifier.

9. A method for generating a rule ontology, comprising the steps of:
   a. generating at least one structured document containing at least one rule statement;
   b. preparing said at least one structured document for a logic conversion, wherein the step of preparing said at least one structured document for a logic conversion comprises:
      i. tagging said structured document with a plurality of tags wherein the plurality of tags are selected from a group of tags consisting of a referential tag, an authority tag, a functional tag, and an entity tag;
      ii. identifying a rule statement within the structured document;
      iii. determining whether the identified rule statement contains a semantic qualifier term; and
      iv. upon a condition in which the identified rule statement contains a semantic qualifier term, tagging said semantic qualifier term with an identifier, wherein the semantic qualifier term includes a logical term, linking verb, modal term, alethic term, deontic term, and a quantifier term;
   c. generating at least one logic statement using a logic language, wherein said logic language is Rule Description Logic (RDL), and wherein the step of generating at least one logic statement using RDL comprises:
      i. determining whether the structured document contains at least two concepts;
      ii. upon a condition in which the structured document contains at least two concepts is determined to have occurred, determining whether the at least two concepts are members of a group of logic concepts wherein said group of logic concepts consists of an atomic concept, a Cartesian product of atomic concepts, a universal restriction, an existential restriction, an obligatory concept and a permitted concept;
      iii. upon a condition in which the structured document contains at least two concepts is determined to have occurred, expressing a factual relationship among the logic concepts resulting in an RDL statement;
      iv. determining whether the structured document contains a role;
      v. upon a condition in which the structured document contains a role is determined to have occurred, determining whether the role is a member of a group of logic roles wherein said group of logic roles consists of an atomic role, a Cartesian product of atomic roles, and a role inverse of an atomic role;
      vi. upon a condition in which the structured document contains at least two concepts and the structured document contains a role is determined to have occurred, expressing at least one factual relationship among the logic concepts identified in step (ii) and the logic roles identified in step (v) resulting in an RDL statement;
      vii. upon a condition in which the structured document contains an obligatory concept or the structured document contains a permitted concept is determined to have occurred, expressing a set of factual relationships among said obligatory concept or said permitted concept and the logic concepts identified in step (ii) resulting in an RDL statement;
      viii. determining whether the structured document contains an assignment relationship;
      ix. upon a condition in which the structured document contains an assignment relationship is determined to have occurred, expressing a factual relationship using the assignment relationship and the logic concepts identified in step (ii);
      x. determining whether the structured document contains a knowledge relationship;
      xi. upon a condition in which the structured document contains an knowledge relationship is determined to have occurred, expressing a factual relationship using the knowledge relationship and the logic concepts identified in step (ii) resulting in an RDL statement;

xii. determining whether the results of steps (i)-(xi) contain a compound statement; and
xiii. upon a condition in which the results of steps (i)-(xi) contain a compound statement is determined to have occurred, generating a plurality of atomic statements from the compound statement;
d. providing said at least one resulting RDL statement to a logic-to-ontology converter to convert said at least one RDL statement into a rule ontology; and
e. linking said rule ontology with a reference to said at least one rule statement.

10. The method of claim 9 wherein the step of expressing at least one factual relationship among the logic concepts identified in claim 9, step (c)(ii) and the logic roles identified in claim 9, step (c)(v) is expressed using the universal restriction or the existential restriction identified in claim 9, step (c)(ii) and an inclusion relation operator.

11. The method of claim 10 wherein the step of converting said at least one logic statement into a rule ontology comprises:
a. generating an additional RDL statement by applying an assignment axiom to the results of claim 9, step (c)(ix);
b. generating an additional RDL statement by applying a knowledge axiom to the results of claim 9, step (c)(xi);
c. generating a set of final RDL statements wherein said set of final RDL statements comprises the results of steps (a)-(b), claim 9, step (c)(iii), claim 9, step (c)(vi), claim 9, step (c)(vii), claim 9, step (c)(ix), claim 9, step (c)(xi), and claim 9, step (c)(xiii);
d. determining whether the set of final RDL statements contains an atomic concept;
e. upon a condition in which the set of final RDL statements contains an atomic concept is determined to have occurred, generating an ontology class corresponding to the atomic concept;
f. determining whether the set of final RDL statements contains an atomic role;
g. upon a condition in which the set of final RDL statements contains an atomic role is determined to have occurred, generating an ontology property corresponding to the atomic role;
h. identifying a concept within the set of final RDL statements having a form selected from the group of forms consisting of $\neg C$, $C \sqcap D$, $C \sqcup D$, $\exists R.D$, and $\forall R.D$;
i. generating an atomic concept for each concept identified in step (h);
j. replacing the result of step (h) with the atomic concept generated in step (i);
k. generating a first ontology class corresponding to the generated atomic concept in step (i);
l. generating a class equivalence relationship within the rule ontology between a second ontology class having the form equivalent to the form of the identified concept in step (h) and the corresponding first ontology class generated in step (k);
m. identifying a concept within the set of final RDL statements having a form selected from the group of forms consisting of P(C), O(C), and C×D;
n. generating an atomic concept for each concept identified in step (m);
o. replacing the concept identified within the final RDL statements in step (m) with the atomic concept generated in step (n);
p. generating an ontology class using the atomic concept generated in step (n);
q. identifying a role within the set of final RDL statements having a form selected from the group of forms consisting of $R^-$, p(C), o(C), a(C), k(C), $p^-(C)$, $o^-(C)$, $a^-(C)$, and $k^-(C)$;
r. generating an atomic role for each role identified in step (q);
s. replacing the role identified within the final RDL statements in step (q) with the atomic role generated in step (r);
t. generating an ontology property corresponding to the atomic role generated in step (r);
u. determining whether the set of final RDL statements contains an RDL statement having a form consisting of $C \sqsubseteq D$;
v. upon a condition in which the set of final RDL statements contains an RDL statement having a form consisting of $C \sqsubseteq D$ is determined to have occurred, generate an ontology subclass relationship corresponding to the RDL statements having a form consisting of $C \sqsubseteq D$;
w. determining whether the set of final RDL statements contains an RDL statement having a form consisting of $C \equiv D$; and
x. upon a condition in which the set of final RDL statements contains an RDL statement having a form consisting of $C \equiv D$ is determined to have occurred, generate an ontology class equivalence relationship corresponding to the RDL statements having a form consisting of $C \equiv D$.

12. The method of claim 11, wherein C and D are atomic concepts, and R is an atomic role.

* * * * *